S. C. ROWLAND.
AUTOMOBILE BUMPER.
APPLICATION FILED JAN. 28, 1916.
1,218,701.
Patented Mar. 13, 1917.
2 SHEETS—SHEET 1.
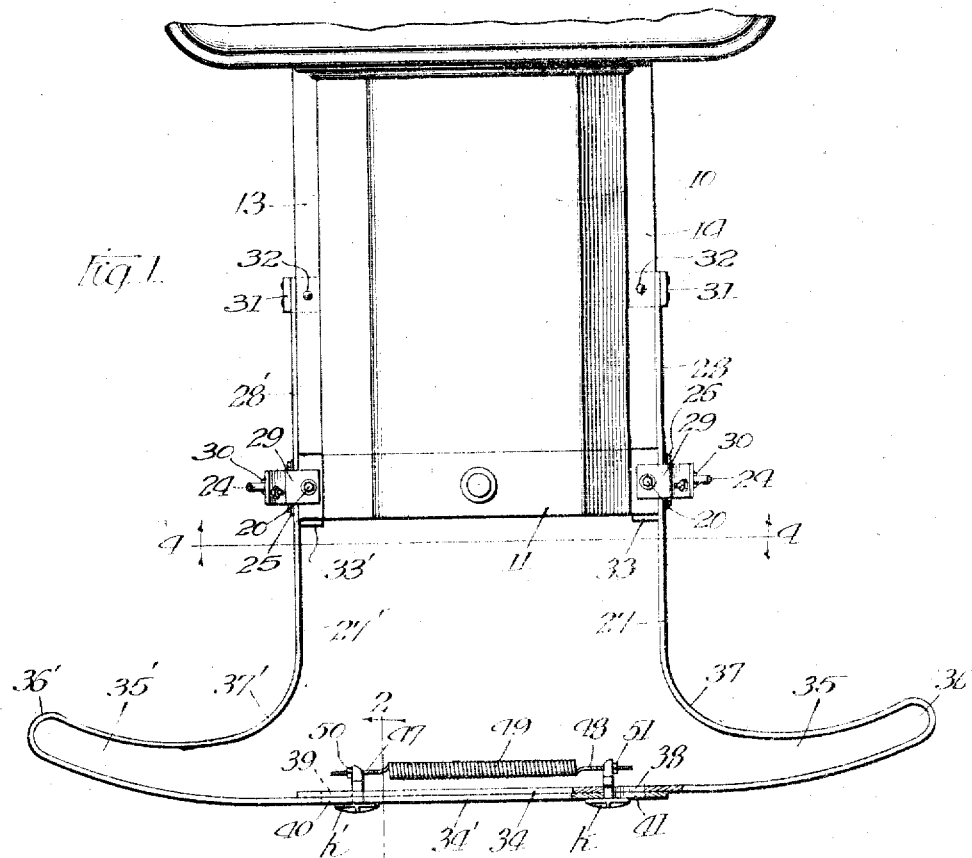
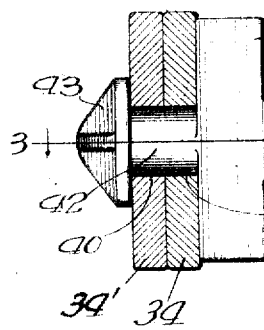
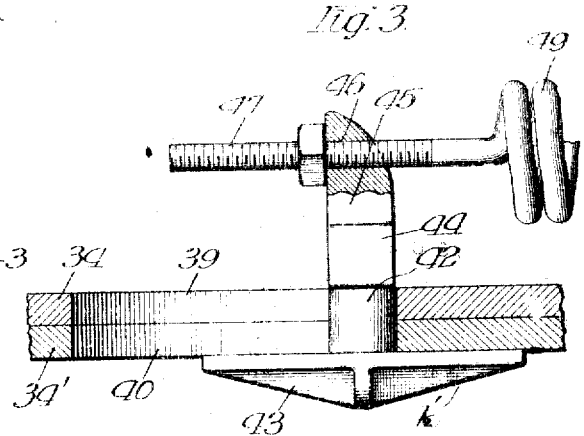
Witnesses
Robert Ferris
Arthur W. Carlow
Inventor
Samuel C. Rowland
by James R. Offield, Atty.

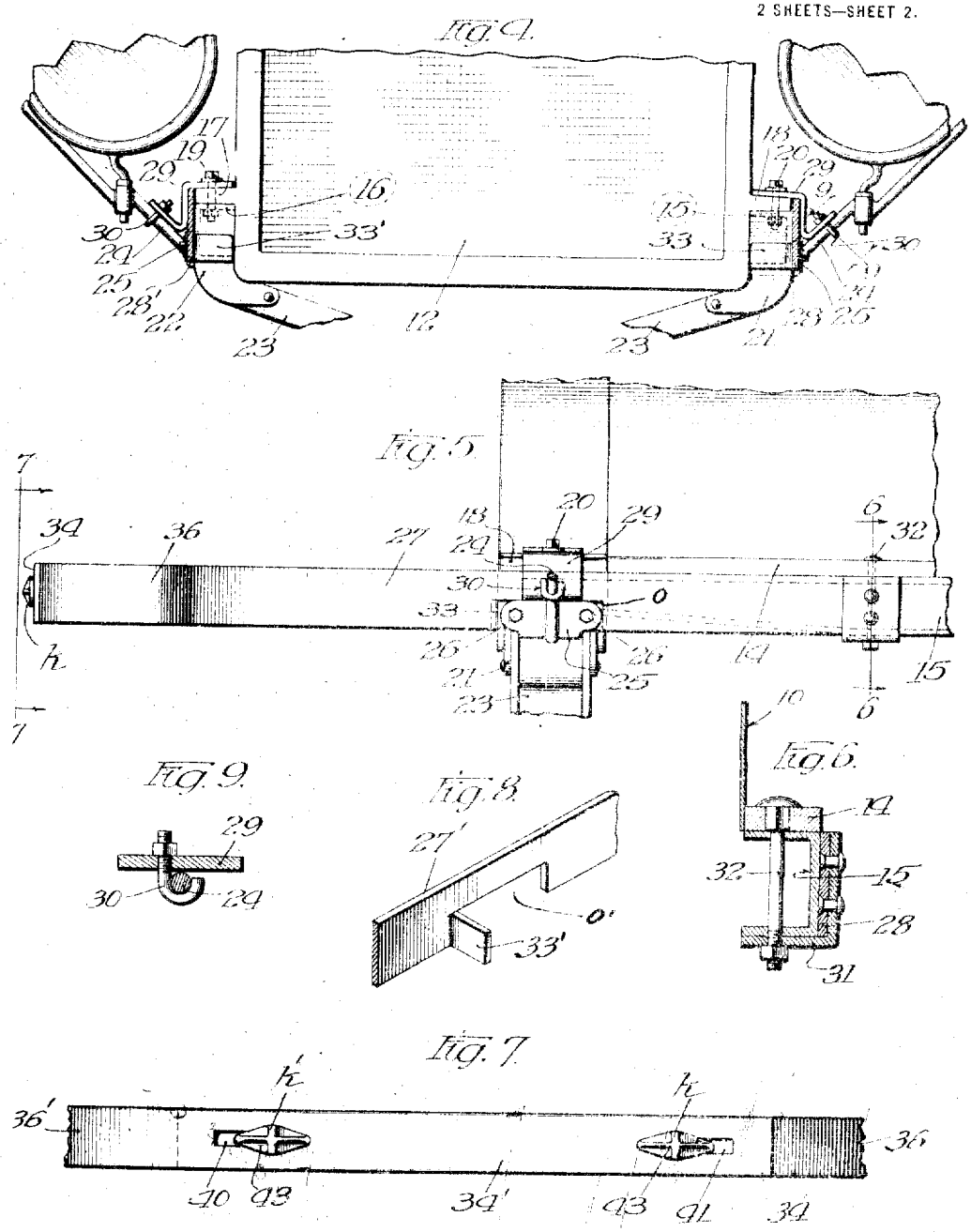

UNITED STATES PATENT OFFICE.

SAMUEL C. ROWLAND, OF CRAWFORDSVILLE, INDIANA, ASSIGNOR TO GENERAL APPLIANCE COMPANY, OF CHICAGO, ILLINOIS, A CORPORATION OF DELAWARE.

AUTOMOBILE-BUMPER.

1,218,701.

Specification of Letters Patent.

Patented Mar. 13, 1917.

Application filed January 28, 1916. Serial No. 74,825.

*To all whom it may concern:*

Be it known that I, SAMUEL C. ROWLAND, a citizen of the United States, and a resident of Crawfordsville, in the county of Montgomery and State of Indiana, have invented certain new and useful Improvements in Automobile-Bumpers, of which the following is a specification.

My invention relates to automobile bumpers and to that class of bumpers which are resilient as a whole.

One of the important objects of my invention is to provide greater flexibility and yield in bumpers of this class so that bumps will be more easily and gradually absorbed and the vehicle thus better protected, the improved construction being particularly to guard against side or diagonal bumps. In general the improvement comprises the application of an auxiliary spring mechanism yieldingly connecting the front overlapping ends of two spring frames which form the bumper so that the bumper as a whole can contract or expand laterally and the spring mechanism will take up a considerable part of the shock and the vehicle will be relieved of just that much jar.

Another object of my invention is to provide improved arrangement for readily and securely applying the bumper to a vehicle particularly where such vehicle is of the Ford type having transverse vehicle springs, the inner ends of the spring frames which form the bumper extending a considerable distance along the outer sides of the vehicle side beams and secured thereto without requiring any removal or changing of existing parts or connections on the vehicle. Such long engagement of the bumper ends with the vehicle makes the bumper structure particularly strong and resistant against vertical displacement.

The various features of my invention are embodied in the arrangements shown on the accompanying drawings in which—

Figure 1 is a plan view of the front end of a vehicle body,

Fig. 2 is an enlarged sectional view on plane 2—2, Fig. 1,

Fig. 3 is a plan view of the parts shown in Fig. 2 with the bumper frame ends in section on plane 3—3, Fig. 2, Fig. 4 is an enlarged view on plane 4—4, Fig. 1, Fig. 5 is an enlarged side elevational view of the parts shown in Fig. 1, Fig. 6 is an enlarged sectional view on plane 6—6, Fig. 5, Fig. 7 is a view from plane 7—7, Fig. 5, Fig. 8 is a perspective view of a section of one of the bumper halves showing a stop lug formed therein, and Fig. 9 is an enlarged sectional view on plane 9—9, Fig. 4.

In Figs. 1 and 4, 10 represents the hood at the front of which is the frame 11 surrounding the radiator 12, the hood being supported on flanges 13 and 14 which rest on and are secured to the channel shaped side beams 15 and 16 of the vehicle frame. The radiator frame 11 is supported by side lugs 17 and 18 which rest on and are secured to the front ends of the vehicle side beams 15 and 16 by means of bolts 19 and 20 respectively. Secured to the front ends of the vehicle side beams are fittings 21 and 22 which support the cross beam 23 to which the front vehicle spring (not shown) is secured. The arrangement described is that on the well known Ford machine. In such machines the lamp supporting rods 24 extend upwardly from plates 25 which are secured to the vehicle side beams at the front ends thereof by bolts 26.

The bumper shown is particularly adapted for application to machines of the Ford type and it comprises the two L-shaped sections 27 and 27' bent up of flat bars of spring metal, preferably steel, and the longitudinally extending ends 28 and 28' of the sections are secured to the vehicle against the outer sides of the side beams 15 and 16, the extent of engagement being considerable, and the manner of securing the ends to the beams being best shown in Figs. 4, 5 and 6. In order to receive the lamp supporting plates 25 the ends 28 and 28' are notched longitudinally in their under edges, as indicated at *o* and *o'*, these notches receiving the plates and the bumper ends thus arching over the plates to lie flatly against the vehicle side beams. In order to lock the bumper ends to the front ends of the vehicle side beams and at the same time to strengthen the lamp supporting structures, Z-shaped plates 29 are provided, the vertical sections of these plates engaging against the outer sides of the bumper bars and the top sections of the plates extending inwardly over the tops of the bumper bars and the lugs 17 and 18 to receive the bolts 19 and 20 so that these plates are secured to the vehicle side beams in common with the lugs 17 and 18. The lower sections of the Z-shaped plates extend against and parallel with the tops of the lamp supporting rods 24 and are connected thereto by J-bolts 30, as shown in Fig. 9.

To secure the rear ends of the bumper sides 28 and 28' to the vehicle side beams L-plates 31 are secured to the bumper sides and extend inwardly against the under sides of the side beams and are secured by bolts 32, which bolts also pass through the flanges 13 and 14 of the hood structure to secure such structure to the vehicle side beams (Fig. 6).

To further secure the bumper structure against rearward displacement and to protect the bolts 19, 20 and 32 against shearing strains, abutment tongues 33 and 33' are provided for abutting against the front sides of the fittings 21 and 22, and these tongues can, as shown, be part of the metal deflected from the bumper sides to form the notches o and o'.

Referring to Figs. 1, 2 and 3, the transverse ends 34 and 34' of the L-shaped bumper halves overlap a distance and between these transverse ends and the longitudinally extending ends 28 and 28' the bars are deflected laterally to form loops 35 and 35', the bends 36 and 36' at the loop ends being abrupt while the bends 37 and 37' between the loops and the sides 28 and 28' are gradual and of comparatively large radius. In the end 34 are inner and outer longitudinal slots 38 and 39 while in the end 34' are similar outer and inner slots 40 and 41, the slots 38 and 39 registering respectively with the slots 41 and 40. The ends 34 and 34' are held together transversely by key members $k$ and $k'$. As best shown in Figs. 2 and 3, each key member comprises a shank section 42 having the head 43 at its outer end elongated longitudinally of the bars, and having at its inner end the bit 44 elongated transversely of the bars. The shanks of the keys $k$ and $k'$ extend respectively through slots 41, 38 and 40, 39, the heads 43 being wider than the slots and the bits 44 extending across the slots, the keys being thus locked in the slots and the bumper ends 34 and 34' being locked against transverse separation, the keys and bars being, however, adapted for relative longitudinal movement. Extending inwardly and centrally from the bit on each key is a lug 45 having a hole 46 therethrough parallel with the bumper ends. The threaded ends 47 and 48 of a coil spring 49 extend through the holes 46 of the keys and are held therein by nuts 50 and 51 engaging against the outer sides of the key lugs. The spring 49 is under tension and tends to hold the shanks of the keys securely against the inner ends of the respective slots so as to resist relative longitudinal movement of the ends 34 and 34'. The elongated heads and bits will hold the lugs 45 at right angles with the bumper ends. The transverse bits 44 will lock the keys in the slots but the width of such bits is preferably a little less than the width of the bumper slots so that when the spring 49 is removed from the keys, the keys can be withdrawn by turning the bits into parallelism with the slots. Application of the keys can be as readily accomplished.

The fender structure described is yieldable as a whole and will effectively yield to blows from any direction or angle. Straight bumps against the central part of the bumper front will be taken up by the loops 35, 35' and the long radius bends 37 and 37'. The bumper structure is particularly efficient in absorbing bumps against the loop ends directly or diagonally. If one of the loop ends is bumped from the front the loop itself and the corresponding bend 37 or 37' will take a great part of the shock and lateral strain on the bumper will be taken care of in greater part by the spring 49 as the ends 34 and 34' tend to separate when the loop is bumped. When a loop is bumped from the side or in a direction more or less transverse to the vehicle, the spring 49 is particularly effective in protecting the bumper structure, for under such blow the struck loop can yield transversely of the vehicle a distance equal to the length of the key slots. In other words, not only is my improved bumper yieldable and controllable as a whole but its two sections are yieldingly connected together and a wider and more efficient range of operation is therefore provided. The spring 49, being behind the bumper front, is amply protected and its tension can be readily adjusted by means of the nuts 50 and 51.

The particular structure shown is particularly adaptable and efficient on machines of the Ford type on account of the extensive engagement of the bumper ends with the vehicle side beams, such engagement making the bumper structure particularly strong and resistant against vertical displacement or tilting. The bumper ends being continuations of the steel bars forming the bumper halves, the vehicle is particularly strong and durable as the use of fittings, which are usually castings, is eliminated.

I do not of course desire to be limited to the precise constructions and arrangements shown as changes and modifications are no doubt possible which would still come within the scope of the invention.

I claim as follows:

1. An automobile bumper structure comprising two L-shaped halves of spring metal adapted to have their side limbs secured to the opposite sides of a vehicle and having their front limbs overlapping a distance, and means connecting said overlapping ends together, said means being yieldable to permit relative longitudinal movement of said overlapping ends.

2. An automobile bumper comprising two L-shaped members of spring metal, the side limbs of said members being adapted to be secured to the opposite sides of a vehicle and the front limbs extending inwardly substantially at right angles to the side limbs and overlapping a distance, said members being deflected at the junctures of the side and front limbs to form outwardly extending loops, means for locking said overlapping limbs together against relative transverse movement and for permitting limited relative longitudinal movement thereof, and yielding means resisting such relative movement.

3. An automobile bumper structure comprising two L-shaped members adapted to be secured by their side limbs to the opposite sides of a vehicle to extend forwardly thereof, the front limbs of the members extending toward each other and overlapping a distance, keys secured to the respective overlapping sections and a spring connecting said keys for permitting relative longitudinal movement of said overlapping limbs.

4. An automobile bumper structure comprising two similar L-shaped members adapted to be secured by their side limbs to the opposite sides of a vehicle to extend forwardly thereof, the front limbs of said members extending toward each other and overlapping a distance horizontally, keys securing said overlapping limbs together against relative transverse movement and adapted for limited longitudinal movement relative to the limbs, and a spring connecting said keys together for resisting relative longitudinal movement of said limbs.

5. An automobile bumper structure comprising two similar L-shaped members of spring metal adapted to be secured by their side limbs to the opposite sides of a vehicle to extend forwardly therefrom, the front limbs of said members extending toward each other and overlapping a distance, means for securing said overlapping limbs against relative transverse movement and for permitting relative longitudinal movement thereof, and yielding means for resisting such relative longitudinal movement.

6. An automobile bumper structure comprising two similar L-shaped members adapted to be secured by their side limbs to a vehicle to extend parallelly and forwardly therefrom, the front limbs of said members extending toward each other and overlapping a distance, registering slots in the overlapping sections of said front limbs, means engaging in said slots to lock the overlapping sections against relative transverse movement but to permit relative longitudinal movement thereof, and yielding means for resisting such relative longitudinal movement.

7. An automobile bumper structure comprising two similar L-shaped members bent up of spring metal adapted to be secured by their side limbs to the sides of a vehicle to extend forwardly therefrom, the front limbs of said members extending toward each other and overlapping a distance, two sets of registering longitudinal slots in the overlapping sections of said front limbs, a key coöperating with each set of slots, said keys being adapted to lock the overlapping sections against relative transverse movement but permitting relative longitudinal movement thereof, and a spring connecting said keys for resisting such relative longitudinal movement.

8. An automobile bumper structure comprising two L-shaped members of spring material adapted to be secured by their side limbs to the sides of a vehicle to extend forwardly therefrom, the front limbs of said members extending toward each other and overlapping a distance, two sets of registering slots in the overlapping sections of the front limbs, a pin extending through each set of slots and having ends for engaging with the front and rear sides of the overlapping sections whereby said pins will prevent relative transverse movement of said overlapping sections and will permit relative longitudinal movement thereof, and an adjustable spring connecting said pins for resisting such relative longitudinal movement.

9. A bumper structure comprising two L-shaped members of spring metal adapted to be secured by their side limbs to the opposite sides of a vehicle to extend forwardly therefrom, the front limbs of said members extending toward each other and overlapping a distance, registering slots in the overlapping sections of said front members, a pin extending through said slots for limiting relative longitudinal movement of said members, said pin having a head at one end and a bit at the other end, said head and bit preventing relative transverse movement of said overlapping sections, and yielding means tending to resist relative longitudinal movement of said overlapping sections, said bit having a width adapting it to pass through said slots when the pin is turned to bring the bit into parallelism with the slots.

10. A bumper structure for automobiles comprising two similar L-shaped members bent up of spring metal and adapted to be secured by their side limbs to the opposite sides of a vehicle to extend forwardly therefrom, the front limbs of said members extending toward each other and overlapping a distance, two sets of horizontal slots in said overlapping limbs, a key extending through each set of slots for limiting the relative longitudinal movement of said overlapping ends, a head on each key and a bit coöperating therewith to lock said overlapping limbs against relative transverse movement, a lug extending from each key, and a tension spring having adjustable connection at its ends with said lugs, said spring serving to resist relative longitudinal movement of said overlapping limbs.

In witness whereof I hereunto set my hand this 22nd day of January, A. D., 1916.

SAMUEL C. ROWLAND.